Oct. 8, 1929.  W. M. PHILLIPS  1,731,202

CHROMIUM PLATED EXHAUST VALVE

Filed Nov. 16, 1925

Inventor
WILLIAM M. PHILLIPS

Attorneys

Patented Oct. 8, 1929

1,731,202

UNITED STATES PATENT OFFICE

WILLIAM M. PHILLIPS, OF BIRMINGHAM, MICHIGAN, ASSIGNOR TO GENERAL MOTORS CORPORATION, OF DETROIT, MICHIGAN, A CORPORATION OF DELAWARE

CHROMIUM-PLATED EXHAUST VALVE

Application filed November 16, 1925. Serial No. 69,443.

The invention relates to the treatment of articles which are subjected in use to especially severe conditions of wear or corrosion. As an example and a specific embodiment of the invention, it will be herein described as applied to valves for internal combustion engines. The exhaust valves of such engines are exposed to the highly heated products of combustion and are therefore subject to rapid deterioration particularly on the surfaces where the gases impinge as they escape from the combustion chamber. This effect is especially troublesome in the case of valves having steel stems, a type of valve now commonly used. Corrosion and erosion soon wear away the stem of such valves to such an extent as to necessitate replacement. The guide bearing in which the valve stem is supported is also subjected to very severe wear especially in the case of the exhaust valves, due not only to the high temperatures and the presence of corrosive gases but also to the difficulty of providing effective lubrication. The conditions under which the intake valves operate are less severe, but the head of the intake valve is exposed to the hot products of combustion and the stem to wear such that it may be desirable to apply the protection contemplated by the invention to the intake valves as well as the exhaust valves.

The invention has as its principal object therefore the provision of means to reduce the wear and to protect the surface of the metal against the effects of flame and hot gases. To this end the invention contemplates the application to the metal of a coating, preferably electrolytically deposited, of a material which possesses a very high resistance to wear under the conditions mentioned. The material which is preferred for this purpose is chromium. This I have found to be remarkably resistant to abrasion and to the corrosive effects of products of combustion and, when applied to the surface of the metal even in a very thin film such as is obtained very quickly by electroplating, affords to the coated surfaces a high degree of protection against corrosion and wear.

Figure 1:
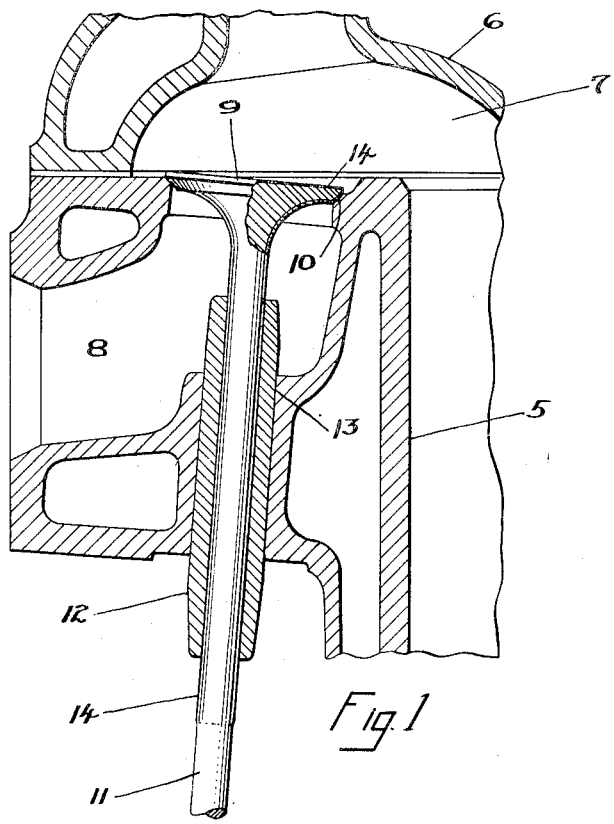
Figure 2:
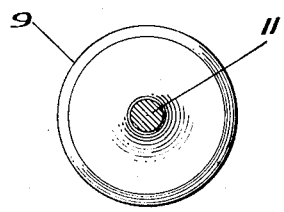

In the accompanying drawing, in which I have shown the application of the invention to an engine valve, Fig. 1 is a section through a portion of the cylinder and valve chamber of an internal combustion engine and Fig. 2 is a bottom plan view of the valve shown in elevation and partly in section in Fig. 1.

Referring to the drawing, in which, for purposes of illustration, the invention will be described as applied to the exhaust valve, 5 indicates the cylinder wall of an engine cylinder, and 6 the engine head. A combustion chamber 7 in the head communicates with the interior of the cylinder and with the passage 8 through which exhaust gases are discharged from the engine. Discharge of gases is controlled in the usual manner by a valve the head 9 of which engages with the seat 10 at the outlet from the combustion chamber. The stem 11 of the valve is supported and guided in a bearing member 12 which may be formed integrally with the engine block or may be, as shown, a sleeve mounted in a supporting portion 13 of the block. The valve will, of course, be actuated in any usual or suitable manner, as by a tappet acting upon the stem 18 to open the valve at the desired time.

Upon the surfaces of the valve subjected to corrosion and wear I provide a coating 14 of a metal highly resistant to deteriorating influences of the character herein referred to. The metal which I have found most suitable is chromium and it is preferred to form the coating by electrodeposition. A relatively very thin coating of chromium thus applied is found to increase greatly the life of the valve.

The coating may be applied, as shown, over the entire head portion of the valve as well as the stem, and this may be desirable, either because of convenience in the plating operation, or when the valve head is constituted of a metal which is itself not highly resistant to corrosion. If desired, however, the coating may be confined to the stem portion of the valve, particularly when the head is of cast iron and the stem is of steel, which latter is more susceptible to corrosion by the exhaust gases. It will be understood that the gases escaping from the combustion chamber impinge directly upon the stem and also heat the bearing to a high temperature. The valve stem is therefore preferably coated throughout both the portion within the bearing and the portion exposed directly to contact with the escaping gases.

While I have herein described the invention in a specific application it is not desired to be restricted by reason of such description except as required by the language of the appended claims in view of the prior art.

I claim:

1. In an internal combustion engine the combination of a passage for exhaust gases having a bearing adjacent thereto and a poppet valve arranged to control flow of exhaust gases through said passage and having a portion of its stem supported in said bearing and another portion exposed in said passage, said stem having both said portions coated with chromium.

2. A poppet valve for internal combustion engines having a guide bearing for the stem portion, said stem being coated with chromium.

3. A bearing member and a member supported therein for relative movement and frictional engagement therewith, one of said members being plated with chromium.

4. In combination with an internal combustion engine having an exhaust passage and a guide for a valve, a valve arranged to control flow through said passage and having a portion positioned in the path of flow of the exhaust gases and another portion in frictional engagement with said guide, both said portions of said valve being coated with an electrolytic deposit of chromium.

In testimony whereof I affix my signature.

WILLIAM M. PHILLIPS.